(12) United States Patent
Landolt

(10) Patent No.: US 7,720,108 B2
(45) Date of Patent: May 18, 2010

(54) APPARATUS AND METHOD FOR INSERTING SYNCHRONIZATION HEADERS INTO SERIAL DATA COMMUNICATION STREAMS

(75) Inventor: Oliver Landolt, Taufkirchen (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 864 days.

(21) Appl. No.: 11/535,888

(22) Filed: Sep. 27, 2006

(65) Prior Publication Data
US 2007/0071003 A1 Mar. 29, 2007

(30) Foreign Application Priority Data
Sep. 27, 2005 (EP) .................. 05021064
Oct. 28, 2005 (EP) .................. 05023686

(51) Int. Cl.
*H04J 3/06* (2006.01)
(52) U.S. Cl. .................................... 370/503
(58) Field of Classification Search .......... 341/59; 370/503
See application file for complete search history.

(56) References Cited
U.S. PATENT DOCUMENTS
5,481,543 A * 1/1996 Veltman ............... 370/473
6,584,120 B1 * 6/2003 Shiomoto et al. ........... 370/473
2004/0075594 A1 4/2004 Kuo et al.

FOREIGN PATENT DOCUMENTS
DE 3444315 6/1986
DE 3526052 2/1987
DE 3835338 4/1990

OTHER PUBLICATIONS

Widmer, A. X., et al., "A DC-Balanced, Partitioned-Block, 8B/10B Transmission Code," IBM J. Res Develop., vol. 27, No. 5, Sep. 1983.

* cited by examiner

*Primary Examiner*—Derrick W Ferris
*Assistant Examiner*—Mang Yeung
(74) *Attorney, Agent, or Firm*—Lewis, Rice & Fingersh, L.C.

(57) ABSTRACT

An apparatus for transmitting synchronization headers into multiple high-speed serial data communications streams comprising an input channel receiving B symbols, a first output channel outputting A symbols, a second output channel outputting B symbols, a header sequence generator generating H symbols, one multiplexer per output channel, a temporary storage unit storing H×B input symbols, and a control unit coordinating the operation of the apparatus operating according to an input clock signal.

19 Claims, 6 Drawing Sheets

Table 1   5B / 6B Encoding.

| Name | ABCDEK | Classifications Bit encoding | Classifications Disparity | D-1 | abcdei | D0 | abcdei Alternate |
|---|---|---|---|---|---|---|---|
| D.0 | 00000 0 | L04 | L22'·L31'·E' | + | 011000 | − | 100111 |
| D.1 | 10000 0 | L13·E' | L22'·L31'·E' | + | 100010 | − | 011101 |
| D.2 | 01000 0 | L13·E' | L22'·L31'·E' | + | 010010 | − | 101101 |
| D.3 | 11000 0 | L22·E' | | x | 110001 | 0 | |
| D.4 | 00100 0 | L13·E' | L22'·L31'·E' | + | 001010 | − | 110101 |
| D.5 | 10100 0 | L22·E' | | x | 101001 | 0 | |
| D.6 | 01100 0 | L22·E' | | x | 011001 | 0 | |
| D.7 | 11100 0 | | L31·D·E' | − | 111000 | 0 | 000111 |
| D.8 | 00010 0 | L13·E' | L22'·L31'·E' | + | 000110 | − | 111001 |
| D.9 | 10010 0 | L22·E' | | x | 100101 | 0 | |
| D.10 | 01010 0 | L22·E' | | x | 010101 | 0 | |
| D.11 | 11010 0 | | | x | 110100 | 0 | |
| D.12 | 00110 0 | L22·E' | | x | 001101 | 0 | |
| D.13 | 10110 0 | | | x | 101100 | 0 | |
| D.14 | 01110 0 | | | x | 011100 | 0 | |
| D.15 | 11110 0 | L40 | L22'·L31'·E' | + | 101000 | − | 010111 |
| D.16 | 00001 0 | L04, L04·E | L22'·L13'·E | − | 011011 | + | 100100 |
| D.17 | 10001 0 | L13·D'·E' | | x | 100011 | 0 | |
| D.18 | 01001 0 | L13·D'·E' | | x | 010011 | 0 | |
| D.19 | 11001 0 | | | x | 110010 | 0 | |
| D.20 | 00101 0 | L13·D'·E | | x | 001011 | 0 | |
| D.21 | 10101 0 | | | x | 101010 | 0 | |
| D.22 | 01101 0 | | | x | 011010 | 0 | |
| D/K.23 | 11101 x | | L22'·L13'·E | − | 111010 | + | 000101 |
| D.24 | 00011 0 | L13·D·E | L13·D·E | + | 001100 | − | 110011 |
| D.25 | 10011 0 | | | x | 100110 | 0 | |
| D.26 | 01011 0 | | | x | 010110 | 0 | |
| D.27 | 11011 x | L22·K | L22'·L13'·E | − | 110110 | + | 001001 |
| D.28 | 00111 0 | | | x | 001110 | 0 | |
| K.28 | 00111 1 | L22·K | K | x | 001111 | − | 110000 |
| D/K.29 | 10111 x | | L22'·L13'·E | − | 101110 | + | 010001 |
| D/K.30 | 01111 x | | L22'·L13'·E | − | 011110 | + | 100001 |
| D.31 | 11111 0 | L40, L40·E | L22'·L13'·E | − | 101011 | + | 010100 |

Table 2   3B / 4B Encoding.

| Name | FGHK | Classifications Bit encoding | Classifications Disparity | D-1 | fghj | D0 | fghj Alternate |
|---|---|---|---|---|---|---|---|
| D/K.x.0[a] | 000 x | F'·G'·H' | F'·G' | + | 0100 | − | 1011 |
| D.x.1 | 100 0 | (F≠G)·H' | | x | 1001 | 0 | |
| D.x.2 | 010 0 | (F≠G)·H' | | x | 0101 | 0 | |
| D/K.x.3[a] | 110 x | | F·G | − | 1100 | + | 0011 |
| D/K.x.4[a] | 001 x | | F'·G' | + | 0010 | − | 1101 |
| D.x.5 | 101 0 | | | x | 1010 | 0 | |
| D.x.6 | 011 0 | | | x | 0110 | 0 | |
| D.x.P7 | 111 0 | | F·G, F'·G'·H | − | 1110 | + | 0001 |
| D/K.y.A7[h,c] | 111 x | F·G·H·(S+K) | F·G, F'·G'·H | − | 0111 | + | 1000 |
| K.28.1 | 100 1 | (F≠G)·H' | (F≠G)·K | + | 1001 | 0 | 0110 |
| K.28.2 | 010 1 | (F≠G)·H' | (F≠G)·K | + | 0101 | 0 | 1010 |
| K.28.5 | 101 1 | | (F≠G)·K | + | 1010 | 0 | 0101 |
| K.28.6 | 011 1 | | (F≠G)·K | + | 0110 | 0 | 1001 |

[a] K.x is restricted to K.28.
[h] K.y is restricted to K.23, K.27, K.28, K.29, K.30.
[c] S = {c·i·(D-1=−)} OR {e·i'·(D-1=+)}.

| CLK cycle | input streams | | | | | | | | | output streams | | | | | | | | | |
|---|---|---|---|---|---|---|---|---|---|---|---|---|---|---|---|---|---|---|---|
| | 8 | 7 | 6 | 5 | 4 | 3 | 2 | 1 | 0 | 9 | 8 | 7 | 6 | 5 | 4 | 3 | 2 | 1 | 0 |
| 0 | A0 | B0 | C0 | D0 | E0 | F0 | G0 | H0 | I0 | 0 | 0 | 0 | 0 | 0 | 0 | 0 | 0 | 0 | 0 |
| 1 | A1 | B1 | C1 | D1 | E1 | F1 | G1 | H1 | I1 | 1 | 1 | 1 | 1 | 1 | 1 | 1 | 1 | 1 | 1 |
| 2 | A2 | B2 | C2 | D2 | E2 | F2 | G2 | H2 | I2 | 0 | A2 | B2 | C2 | D2 | E2 | F2 | G2 | H2 | I2 |
| 3 | A3 | B3 | C3 | D3 | E3 | F3 | G3 | H3 | I3 | 0 | A3 | B3 | C3 | D3 | E3 | F3 | G3 | H3 | I3 |
| 4 | A4 | B4 | C4 | D4 | E4 | F4 | G4 | H4 | I4 | 0 | A4 | B4 | C4 | D4 | E4 | F4 | G4 | H4 | I4 |
| ... | ... | ... | ... | ... | ... | ... | ... | ... | ... | ... | ... | ... | ... | ... | ... | ... | ... | ... | ... |
| 12 | A12 | B12 | C12 | D12 | E12 | F12 | G12 | H12 | I12 | 0 | A12 | B12 | C12 | D12 | E12 | F12 | G12 | H12 | I12 |
| 13 | A13 | B13 | C13 | D13 | E13 | F13 | G13 | H13 | I13 | 0 | A13 | B13 | C13 | D13 | E13 | F13 | G13 | H13 | I13 |
| 14 | A14 | B14 | C14 | D14 | E14 | F14 | G14 | H14 | I14 | I0 | A14 | B14 | C14 | D14 | E14 | F14 | G14 | H14 | I14 |
| 15 | A15 | B15 | C15 | D15 | E15 | F15 | G15 | H15 | I15 | H0 | A15 | B15 | C15 | D15 | E15 | F15 | G15 | H15 | I15 |
| 16 | A16 | B16 | C16 | D16 | E16 | F16 | G16 | H16 | I16 | G0 | A16 | B16 | C16 | D16 | E16 | F16 | G16 | H16 | I16 |
| ... | ... | ... | ... | ... | ... | ... | ... | ... | ... | ... | ... | ... | ... | ... | ... | ... | ... | ... | ... |
| 21 | A21 | B21 | C21 | D21 | E21 | F21 | G21 | H21 | I21 | B0 | A21 | B21 | C21 | D21 | E21 | F21 | G21 | H21 | I21 |
| 22 | A22 | B22 | C22 | D22 | E22 | F22 | G22 | H22 | I22 | A0 | A22 | B22 | C22 | D22 | E22 | F22 | G22 | H22 | I22 |
| 23 | A23 | B23 | C23 | D23 | E23 | F23 | G23 | H23 | I23 | I1 | A23 | B23 | C23 | D23 | E23 | F23 | G23 | H23 | I23 |
| 24 | A24 | B24 | C24 | D24 | E24 | F24 | G24 | H24 | I24 | H1 | A24 | B24 | C24 | D24 | E24 | F24 | G24 | H24 | I24 |
| 25 | A25 | B25 | C25 | D25 | E25 | F25 | G25 | H25 | I25 | G1 | A25 | B25 | C25 | D25 | E25 | F25 | G25 | H25 | I25 |
| ... | ... | ... | ... | ... | ... | ... | ... | ... | ... | ... | ... | ... | ... | ... | ... | ... | ... | ... | ... |
| 30 | A30 | B30 | C30 | D30 | E30 | F30 | G30 | H30 | I30 | B1 | A30 | B30 | C30 | D30 | E30 | F30 | G30 | H30 | I30 |
| 31 | A31 | B31 | C31 | D31 | E31 | F31 | G31 | H31 | I31 | A1 | A31 | B31 | C31 | D31 | E31 | F31 | G31 | H31 | I31 |

APPARATUS AND METHOD FOR INSERTING SYNCHRONIZATION HEADERS INTO SERIAL DATA COMMUNICATION STREAMS

CROSS REFERENCE TO RELATED APPLICATION(S)

This application claims priority to and benefit of European Patent Application Serial Number: 05 021 064.0 filed Sep. 27, 2005 and European Patent Application Serial Number: 05 023 686.8 filed Oct. 28, 2005. The entire disclosure of both documents is herein incorporated by reference.

BACKGROUND

1. Field of the Invention

The present patent concerns data communication from a transmitter chip to a receiver chip over multiple high-speed serial lanes.

2. Description of the Related Art

For data communication between two chips, it is common to use parallel buses with a relatively low data rate per I/O pin, whereby the interface circuitry remains simple. In order to obtain higher data rates, the bus width can be increased while keeping the data rate per input-output (I/O) pin constant. However, there exist applications where the required data rate is that high that the number of I/O pins per chip and the number of lines between the two chips are a significant constraint in the design. For example, one such application is an analog-to-digital (A/D) converter operating at a rate of several billion samples per second. At such data rates, it becomes necessary to develop advanced interface circuitry at the transmitter and receiver end in order to transmit data as fast as physically possible over each line. Thus a high number of links between the two chips can be avoided. The data rate per line can be maximized by high-speed serial schemes in which the receiver recovers both clock and data from the signal. Such high-speed serial interfaces are already in widespread use in many telecommunication- and computer-related products. Examples are fiber optic interfaces or hard disks.

One issue that has to be addressed when a serial data transmission scheme is designed is synchronization between transmitter and receiver. Special indicators are inserted in the data flow in order to determine where a data frame begins and ends. In order to take care of this additional signalling effort, the bit transfer rate over the physical channel is somewhat higher than the rate at which useful data is written to the transmitter interface. For instance, the 10 Gb/s Ethernet standard is based on frames with a length of 66 bits where 64 bits constitute payload data and 2 bits are used for synchronization. The transmit clock rate specified in this standard is 10.31 GHz that is 66/64·10 GHz. The ratio between the transmit clock rate and the clock rate of the data to transmit is integer, since the data is received from the transmitter on a 64-bit wide parallel bus that is clocked with a frequency of 156.25 MHz which is typically derived from the same frequency reference as the 10 GHz base clock. The handling of clock frequencies at circuit interfaces or if occurring within circuits which are not a multiple of a common base clock is a substantial difficulty or even poses intractable problems. An example solution could be FIFO buffering implying, however, a large overhead in hardware and power consumption.

For such applications, it is possible to implement transmitter circuits that distribute the data over several high-speed serial lanes.

In telecommunication systems, insertion of synchronization symbols into data streams is a complex process involving several layers. Usually from layer to layer additional information such as address information, check sums, or additional flags for the communication between layers having the same task within the OSI model are attached to the data. The layer most closely related to the invention described herein is the Physical Layer (PHY) which is further decomposed in the 802.3 IEEE Standard for Information Technology and its amended document 802.3ae. It can be roughly described as build up of the elements GMII (Gigabit Media Independent Interface), the Physical Coding Sublayer (PCS), the Physical Medium Attachment (PMA), and a Medium Dependent Interface (MDI).

An encoder that is used in this standard and that was published in A. Widmer, P. Franaszek, "A DC-Balanced, Partitioned-Block, 8B/10B Transmission Code", IBM Journal of Research and Development, Vol. 27, No. 5, pp. 440-451, September 1983 expands incoming parallel data by means of a look-up table. This expanded data is serialized and then transmitted over a serial data line. This encoder is considered an alternative possibility to insert additional data such as headers into a parallel and constantly incoming data stream in a controlled way. As is described later, in contrast to the present invention no buffer is required since the solution is based on a look-up table.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

This existing approach for inserting synchronization symbols works well when the data to be transmitted is received in parallel words at a much slower rate than the symbol rate on the high-speed serial output. In applications such as the mentioned high-speed A/D converters, the input data or sampling rate equals the output symbol rate which can possibly be in the order of several billion data words per second. A straightforward but inefficient solution for inserting synchronization symbols would be to deserialize each incoming high-speed bit stream into a much slower parallel word stream. Then the 8B/10B encoder of Widmer and Franaszek would be applied.

However, deserialization of a high-speed bit stream followed by serialization requires large amounts of circuitry running at high speed, which implies large power consumption. Also, since the output bit rate must be somewhat higher than the input bit rate, this solution would require the interfacing of clock frequencies, e.g. from 10 GHz to 66/64·10 GHz, which requires respective clock conversion circuits or devices.

Because of these and other problems in the art, described herein is an apparatus and a method with the basic layout for an transmission circuit that potentially requires less component overhead and reduces power consumption.

An embodiment of the inventive apparatus may comprise an input channel receiving B symbol, a first output channel outputting A symbols, a second output channel outputting B symbols, a header sequence generator generating H header symbols, at least one multiplexer per output channel, a temporary storage unit storing H×B input symbols, and a control unit coordinating the operation of the header sequence generator, the multiplexer and the temporary storage unit according to a clock signal.

An embodiment of The inventive method comprises the steps of restarting of the header sequence generator to generate a header of H symbols; instructing of all multiplexers to select the current header symbol and to ignore the current data symbol; instructing of the temporary storage unit to store H×B incoming data symbols; maintaining of the settings for H clock cycles; and thereafter, instructing of the first multiplexer and the second multiplexer to select the next data symbol from the temporary storage unit and from the input channel.

Systems and methods discussed herein enable efficient insertion of synchronization symbols within the same clock domain with relatively modest hardware overhead. In particular, hardware required for deserialization into parallel lower-speed word streams is avoided. Thus, power consumption is reduced.

Operating in one clock domain avoids any clock conversion may it be integer or non-integer. It also avoids resampling and FIFO buffering. Thus, the number of circuit elements required is minimized implying minimum power consumption.

BRIEF DESCRIPTION OF THE DRAWINGS

An embodiment of the invention is now described with respect to the drawings.

FIG. 3 shows coding tables for 5B/6B and 3B/4B encoding.

FIG. 7 shows a table with example data streams according to the embodiment of the invention.

DESCRIPTION OF THE PREFERRED EMBODIMENT(S)

In order to improve the understanding of the invention, related background is first briefly described.

Figure 1:
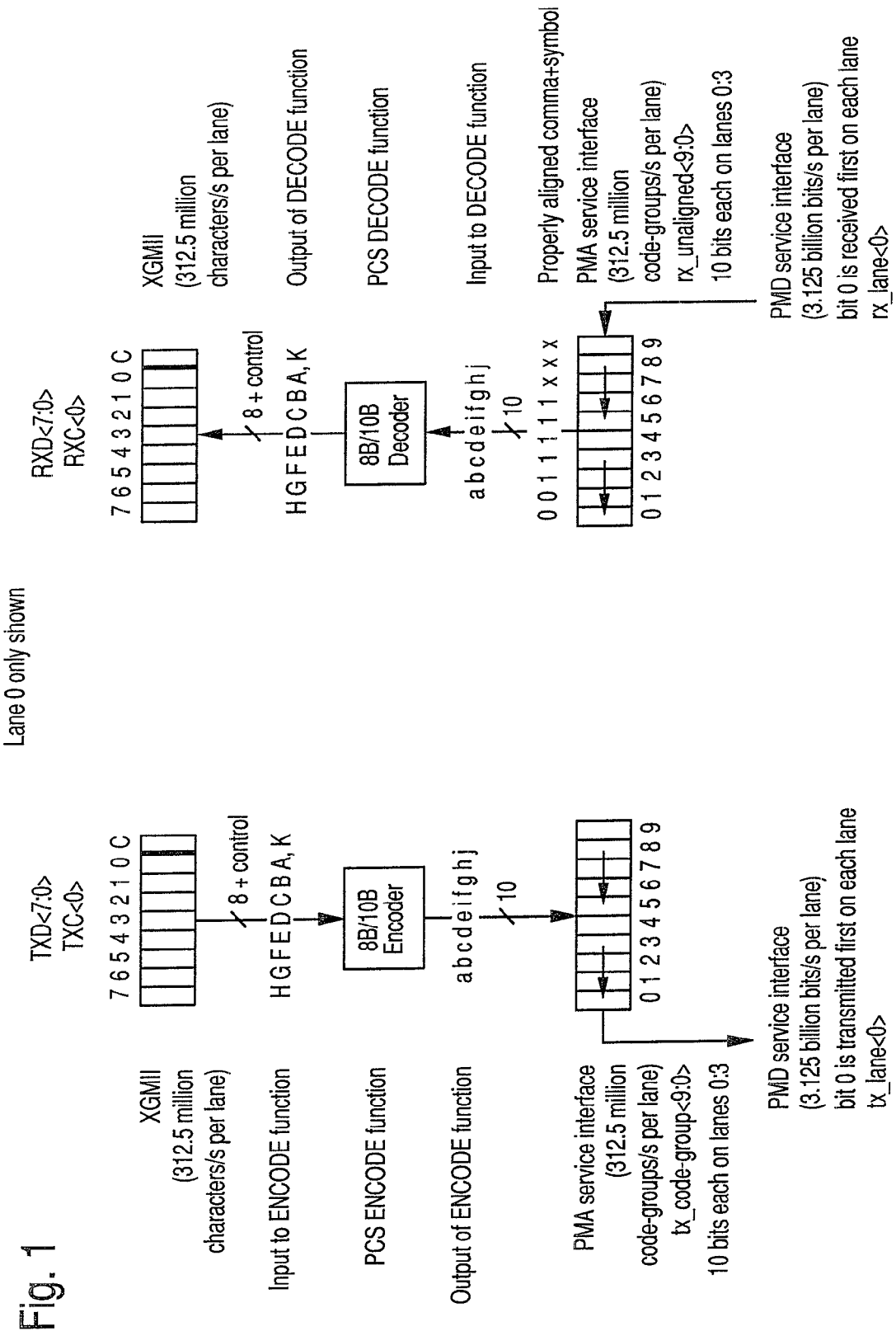
FIG. 1 shows the PCS encode function as embedded between XGMII and PMA layer according to the IEEE 802.3 Ethernet standard.

The purpose of the physical coding sublayer is shown in FIG. 1. As described, from the Gigabit Media Independent Interface (XGMII) a high rate (312.5 million characters per second and lane) is output to a 8B/10B encoder via an 8 bit line (indexed with HGFEDCBA) plus an auxiliary control line, indexed with K. To the PCS a number of four lines is provided each having the mentioned 312.5 million characters per second transfer rate. On the output side the 8B/10B encoder is provided to the PMA (Physical Medium Attachment). The PMA serializes and further forwards the 10 bit wide data stream to the PMD service interface, now handling 3.125 billion bits per second per lane. On the right hand side the 3.125 billion bits/s are handled in reverse order, deserialized and decoded by a 8B/10B decoder providing a combined 8 bit 20 data/control parallel stream, HGFEDCBA+K, to the XGMII input register. A 8B/10B coding/decoding scheme will be explained in the subsequent text.

The 8B/10B coder published in A. Widmer, P. Franaszek, "A DC-Balanced, Partitioned-Block, 8B/10B Transmission Code", IBM Journal of Research and Development, Vol. 27, No. 5, pp. 440-451, September 1983 is shown in FIG. 1. This encoder is very similar to the one employed in the PCS as described above. Channels A to E are converted by the 5B/6B encoding switch and encoded signals are written to or transferred via channels a to i. In a second stage channels F to H are encoded via a 3B/4B encoding switch and the encoded data words are written to channels f to j. These two combined coders provide the 8B/10B encoder published as in the above paper. Control line K indicates according to its status (0 or 1) whether data (0) or control information (1) is transmitted.

Disparity is an important concept for the mentioned 8B/10B encoder. Disparity of a block of data measures the difference between the number of 1s and 0s in the block; positive and negative disparity numbers refer to an excess of 1s and 0s, respectively. Thus disparity is a measure for the dc balance of a channel. For both the 6B=abcdei and 4B=fghj subblocks, the permitted disparity is either 0, +2, or −2. Coding rules require that the polarity 10 alternates if a disparity different from zero occurs. For this purpose, no distinction is made between 6B (6 bit) and 4B (4 bit) subblocks.

Figure 2:
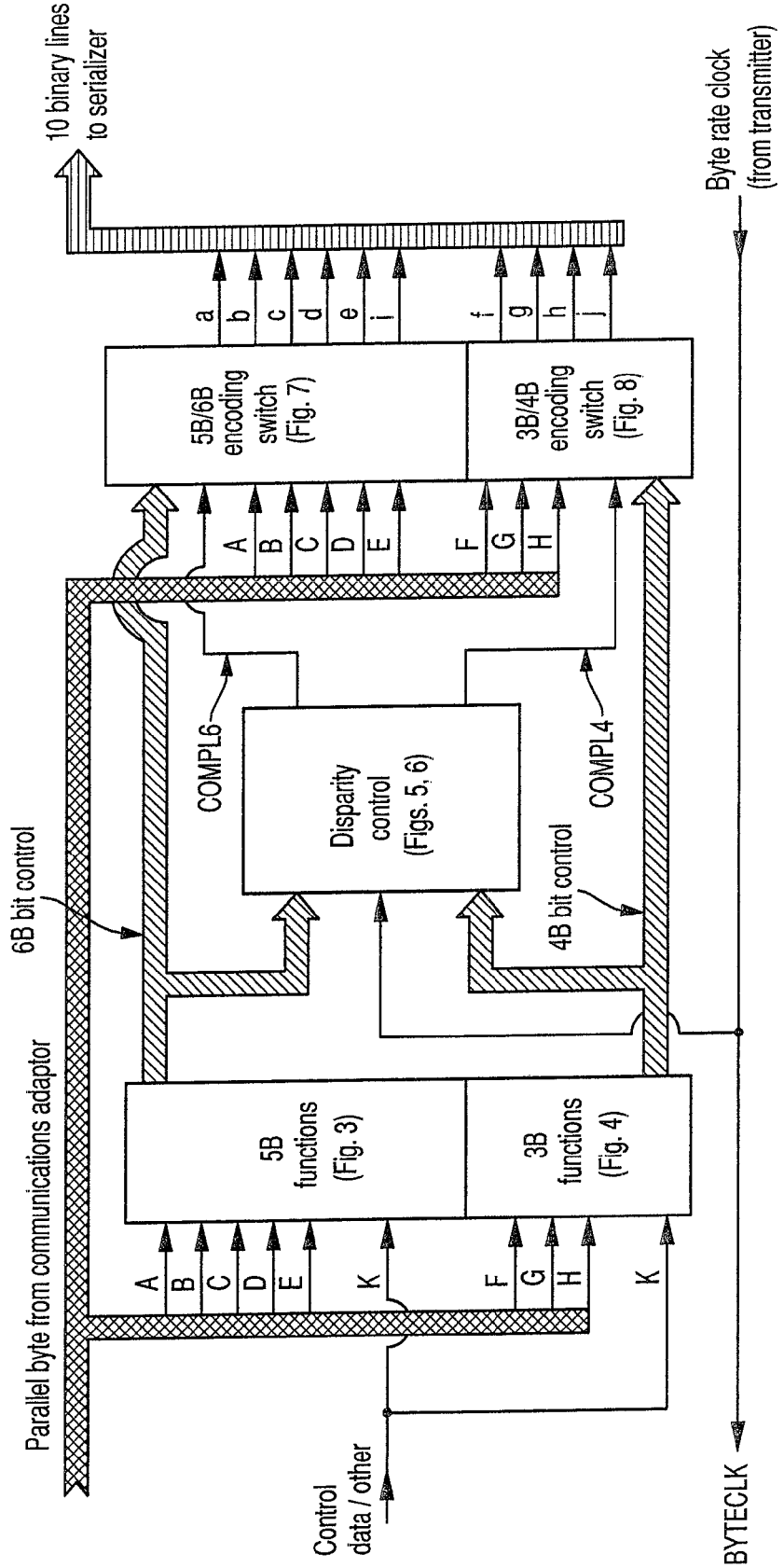
FIG. 2 shows the 8B/10B coding scheme according to A. Widmer and P. Franaszek, "A DC-Balanced, Partioned-Block, 8B/10B Transmission Code."

The encoding scheme conducted by the 8B/10B encoder in FIG. 2 is accomplished by a bit mapping of channels A to E to the channels a to i according to table 1 in FIG. 3 and the mapping of the channels FGH to fghj is accomplished by the code given in table 2 in FIG. 3. In case of the 5B/6B encoding according to table 1 the left hand side column headed by 'Name' gives the 32 equivalents for the input channels A to E. Regular data, D.x, is indicated by setting line K to 0. To encode special characters the K line is set to 1.

When the inputs meet the logical conditions listed on the left side under 'bit encoding,' then the bold type bits are changed to the values shown in the left 'abcdei' column; e.g. if L04 holds, the b and c digits are forced to is, as shown for D.0 and D.16. The second entry in the 'bit encoding' column for D.16 (L04·E) and D.31 (L40·E) applies to the i-digit. For lines with no classification entry, the ABCDE bits translate unchanged into abcde and the added i-bit is set to zero.

Figure 4:
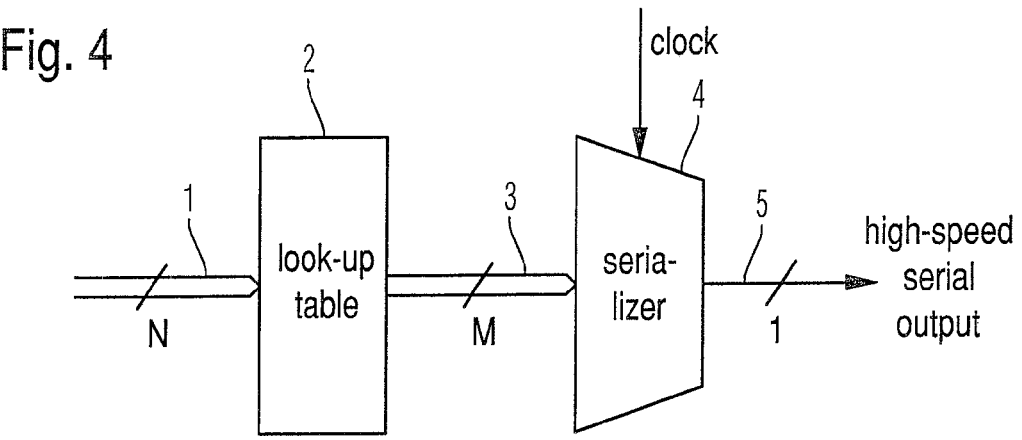
FIG. 4 shows a block diagram of a transmitter circuit according to the state of the art.

In order to make clear the distinction of the invention with respect to the 8B/10B encoder by Widmer and Franaszek, a generalized view of the 8B/10B encoder is developed. This generalized view is shown in FIG. 4. The parallel input lanes ABCDE and FGH are combined into a single input lane indexed with 1 of a width of N bits. The task of the two encoding switches is represented by look-up table 2. Output lines abcdei and fghj are combined into a single look-up table output line 3 of a width of M bits where M>N. Serialization is conducted with serializer 4 which is, in contrast to the paper, explicitly shown and the high speed serial output from the serializer 4 is represented by the 1-bit line 5. The serializer 4 is provided with a high speed clock of frequency f0. The look-up table is clocked with a derived clock frequency of f0/M.

Figure 5:
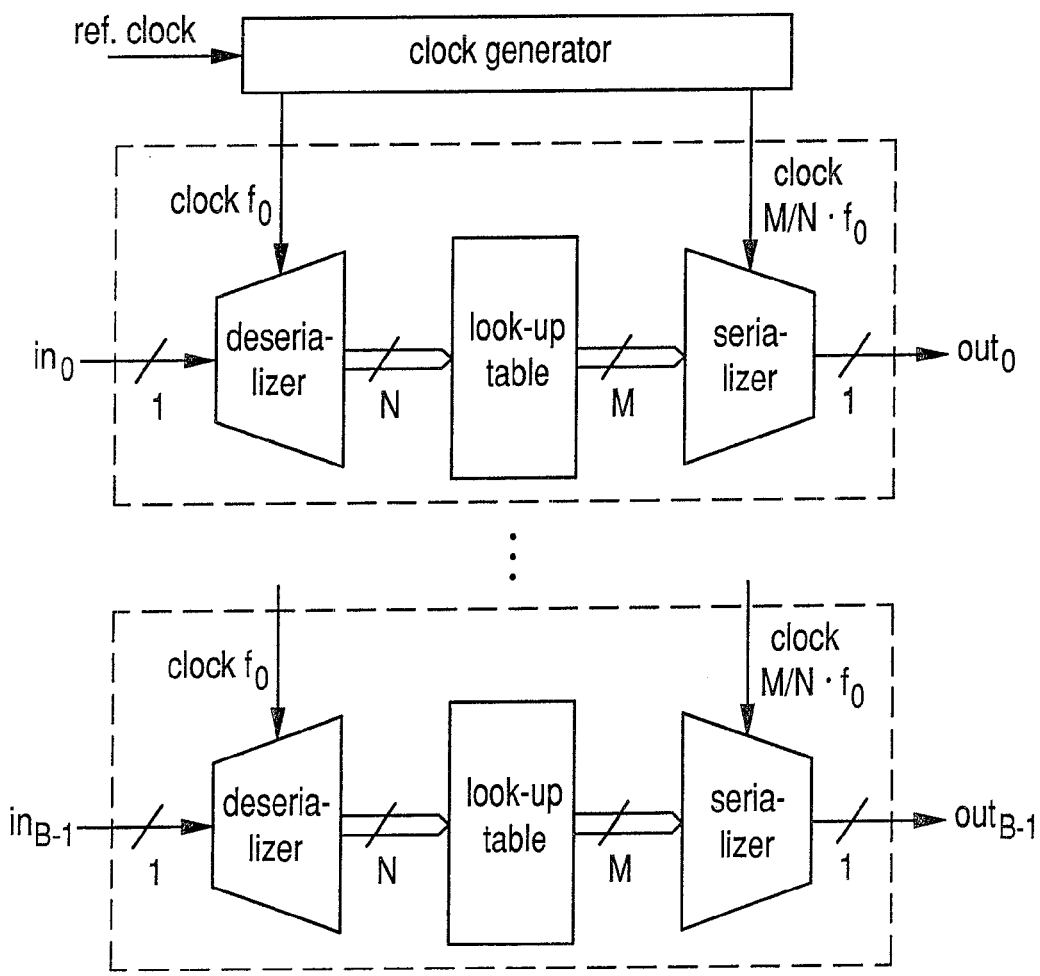
FIG. 5 shows the insertion of synchronization headers in B parallel data streams using state-of-the art circuits.

The invention applies to situations where the incoming data rate is so high that further serialization by a factor M is impractical. To handle this situation using state-of-the art techniques, it would be necessary to deserialize each incoming high-speed input data stream into a slower rate of parallel words, then feed these words into a look up table and serialize the output again. As an example, FIG. 5 shows the case of B incoming data streams where the input and output payload data rates are both equal to f0. The raw data rate on the output side is somewhat higher than f0, namely M/N·f0, in order to accommodate the synchronization overhead introduced through the look-up tables. Thereby, this circuit needs two different clocks with frequencies in the ratio M/N.

The invention described hereafter has the same function as the circuit shown in FIG. 5, but does not need a deserializer and a serializer per data stream, nor does it need a clock generator capable of produce two clock frequencies in the ratio M/N. Thereby, the invention enables considerable reduction of circuit complexity and power consumption.

Figure 6:
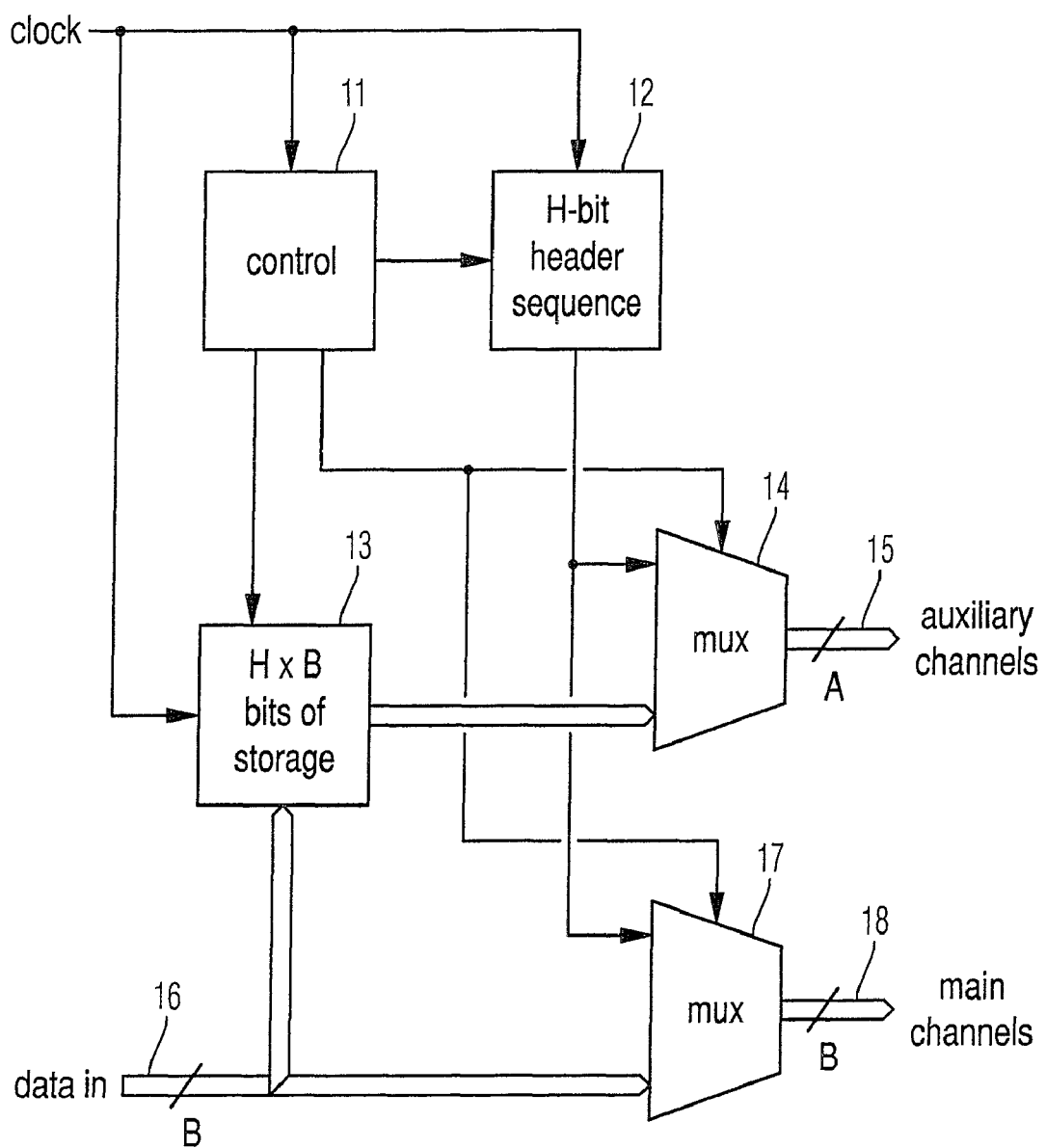
FIG. 6 shows a block diagram of a transmitter circuit according to an embodiment of the invention.

In contrast to this generalized model an embodiment of the invention is shown in FIG. 6. Also in this case data is received in parallel via parallel data input line 16. The input line 16 is B-bit wide. Instead of a look-up table a H×B bits accepting storage 13, a H-bit header sequence generator 12 and two multiplexers 14 and 17 are introduced.

As shown in FIG. 6 the inventive apparatus comprises the 10 following elements: a number B of input channels receiving symbols, a number A of first output channels outputting symbols, a number B of second output channels outputting symbols, a header sequence generating H header symbols, at least one multiplexer per output channel, a temporary storage unit storing H×B input symbols, and a control unit co-ordinating the operation of the header sequence generator, the multiplexer and the temporary storage unit according to a clock signal.

The purpose of the invention is to convert B parallel, synchronous incoming symbol streams into B+A parallel, synchronous outgoing symbol streams, whereby each incoming symbol is present in one of the outgoing streams. An arbitrary header sequence of length H is added and appears at specific times in all outgoing streams while the clock rates of the incoming and outgoing symbol streams are identical.

In practice, the invention will usually be implemented in binary logic. The header sequence itself depends on the communication protocol. For example, in the case of 64B/66B coding, the header sequence is 01 or 10. For 8B/10B coding, the header sequence could be one of the comma characters existing in this code as discussed in A. Widmer, P. Franaszek, "A DC-Balanced, Partitioned-Block, 8B/10B Transmission Code". These mark the start and the end of a packet.

The invention operates in the following way. First, the control unit 11 instructs the H-bit header sequence generator 12 to generate a header of H bits for every 5 output line of the A+B channels, this means A+B headers are generated. Then the multiplexers 14 and 17 are switched so that they receive the header symbols or bits from the H-bit header sequence generator 12. The header is then written to the output channels 15 and 18, i.e. depending on the signalling the voltage of each transmit line is held for one bit at a negative voltage and for the duration of another bit at a positive voltage.

After the header bits are transmitted the multiplexers 14 and 17 are instructed to receive data directly from the data-in line 16 or from the H×B bit storage device 13. In the embodiment of FIG. 6 multiplexer 14 receives its input data from the H×B bit storage device 13 and multiplexer 17 receives its input data directly from the data-in line 16. Both multiplexers 14 and 17 write the data, either from the storage 13 or from the data-in line 16 to the output channels 15 and 18, i.e they convert the bit representation to the respective signalling on the data channel.

The setting is maintained until a frame length of F bits is transmitted. Thereafter, the multiplexers 14 and 17 are again instructed to receive header bits from the H-bit header sequence generator 12. The header sequence generator 12 is then instructed to generate header bits and the storage unit 13 is instructed to store incoming data. This repeated frame generation is conducted until all data is transmitted.

The entire process occurs synchronously to the clock. The number A of auxiliary output streams must be chosen large enough that all H×B stored data symbols can be transmitted within F–H clock cycles. If A is larger than strictly necessary, it is possible that all H×B stored data symbols are transmitted in less than F–H clock cycles. In the remainder of the frame period, arbitrary data symbols (e.g. zeros) can be inserted in the A auxiliary output streams.

For illustration purposes, FIG. 7 shows a table with the incoming and outgoing data lines in the case where B=9, A=1, F=32 and H=2. The header sequence is 01. During clock cycles 0 and 1, data words A0 . . . I0 and A1 . . . I1 are stored into the temporary storage unit. These data words are transmitted serially over output stream number 9. This is conducted during clock cycles 14 through 31. In this example, F–H is 30 whereas H×B is 18, therefore 12 bits per frame in output stream 9 are unused. For this reason, zeros are transmitted on this output stream during clock cycles 2 through 13.

In summary, one key advantage of the invention over the state of the art is that it enables efficient insertion of synchronization headers in data communications channels where the data to be transmitted already comes in at high speed, namely at a rate so high that further serialization is not practical. This situation arises in high-speed A/D converters for instance. The proposed circuit is particularly efficient because of the following features: It does not require deserialization and reserialization. It does not require multiple clocks, especially no clocks running at a fractional frequency ratio.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. An apparatus for transmitting synchronization headers into multiple high-speed serial data communications streams comprising:
    an input channel receiving a number B of symbols in parallel,
    a first output channel transmitting a number A of symbols in parallel,
    a second output channel transmitting a number B of symbols in parallel,
    a control unit,
    a header sequence generator generating a sequence of H header symbols in succession when triggered by the control unit,
    a temporary storage unit storing a number H×B of symbols,
    a first multiplexer connecting one of two signals to the first output channel, and
    a second multiplexer connecting one of two signals to the second output channel,
    wherein the control unit triggers the header sequence generator every time a synchronization header must be transmitted;
    wherein the temporary storage unit stores symbols incoming on the input channel for a number H of symbols after the header sequence generator is triggered;
    wherein the first multiplexer selects the header sequence generator output for a number H of symbols after the header sequence generator is triggered, then it selects the output of the temporary storage unit; and
    wherein the second multiplexer selects the header sequence generator output for a number H of symbols after the header sequence generator is trigger, then it selects the input channel.

2. The apparatus of claim 1 wherein the first multiplexer is connected to the header sequence generator to transmit header symbols when selected.

3. The apparatus of claim 1 wherein the second multiplexer is connected to the header sequence generator to transmit header symbols when selected.

4. The apparatus of claim 1 wherein the first multiplexer is connected to the temporary storage unit and transmits data therefrom when selected.

5. The apparatus of claim 1 wherein the second multiplexer is connected to the input channel and transmits data therefrom when selected.

6. A method for transmitting synchronization headers into multiple high-speed serial data communications streams, the method comprising:
providing an apparatus comprising
an input channel receiving a number of B symbols in parallel,
a first output channel transmitting a number A of symbols in parallel,
a second output channel transmitting a number B of symbols in parallel,
a control unit,
a header sequence generator generating a sequence of H header symbols in succession when triggered by the control unit,
a temporary storage unit storing a number H×B of symbols,
a first multiplexer connecting one of two signals to the first output channel, and
a second multiplexer connecting one of two signals to the second output channel,
the control unit triggering the header sequence generator every time a synchronization header must be transmitted;
the temporary storage unit storing a number of symbols incoming on the input channel for a number H of symbols after the header sequence generator is triggered;
the first multiplexer selecting the header sequence generator output for a number H of symbols after the triggering of the header sequence generator;
the first multiplexer selecting the output of the temporary storage unit;
the second multiplexer selecting the header sequence generator output for a number H of symbols after the header sequence generator is triggered; and
the second multiplexer selecting the input channel.

7. The method of claim 6 wherein the second multiplexer is instructed to transmit data from the input channel.

8. The method of claim 6 wherein the first multiplexer is instructed to transmit data from the temporary storage unit.

9. The method of claim 6 wherein the header is transmitted via the first output channel.

10. The method of claim 6 wherein the header is transmitted via the second output channel.

11. The method of claim 6 wherein the header is transmitted via the first output channel and the second output channel.

12. The method of claim 6 wherein the data from the temporary storage unit is transmitted via the first output channel.

13. The method of claim 6 wherein the input channel has a width of B Bits.

14. The method of claim 13 wherein the first output channel has a width of A Bits.

15. The method of claim 13 wherein the second output channel has a width of B Bits.

16. The method of claim 15 wherein a frame is transmitted composed of header symbols and data symbols.

17. The method of claim 16 wherein the Bit-length F of the frame is larger or equal to H×B+H Bits.

18. The method of claim 17 wherein if Bit-length F of the frame is larger than H×B+H, then the remaining space of the frame is filled with arbitrary symbols.

19. The method of claim 18 wherein said arbitrary symbols are Nulls.

* * * * *